(12) United States Patent
Lee

(10) Patent No.: US 12,281,506 B2
(45) Date of Patent: Apr. 22, 2025

(54) SLIDING DOOR DEVICE FOR VEHICLE

(71) Applicants: HYUNDAI MOTOR COMPANY, Seoul (KR); Kia Corporation, Seoul (KR)

(72) Inventor: Jaeseung Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 322 days.

(21) Appl. No.: 17/895,417

(22) Filed: Aug. 25, 2022

(65) Prior Publication Data
US 2023/0184015 A1  Jun. 15, 2023

(30) Foreign Application Priority Data
Dec. 13, 2021 (KR) .................. 10-2021-0177455

(51) Int. Cl.
*E05D 15/10* (2006.01)
*B60J 5/06* (2006.01)
*E05D 15/06* (2006.01)

(52) U.S. Cl.
CPC ............ *E05D 15/101* (2013.01); *B60J 5/06* (2013.01); *E05D 15/0678* (2013.01); *E05D 2015/1086* (2013.01)

(58) Field of Classification Search
CPC ......... B60J 5/044; B60J 5/047; E05D 15/101; E05D 15/0678; E05D 15/1047; E05D 2015/1086; E05D 2015/1026; E05D 2015/106; E05D 2015/1039; E05Y 2600/41; E05Y 2600/452

USPC ......................................................... 296/155
See application file for complete search history.

(56) References Cited

U.S. PATENT DOCUMENTS

| | | | | |
|---|---|---|---|---|
| 6,036,257 A * | 3/2000 | Manuel | ............... | E05D 15/1081 49/213 |
| 6,935,071 B2 * | 8/2005 | Yokomori | ............. | E05F 15/646 49/213 |
| 7,393,044 B2 * | 7/2008 | Enomoto | .................. | B60J 5/047 296/146.12 |
| 7,641,261 B2 * | 1/2010 | Rusnak | ............... | E05D 15/1047 49/449 |
| 7,669,367 B2 * | 3/2010 | Shimura | ............. | E05D 15/1047 49/213 |
| 8,308,221 B2 * | 11/2012 | Kitayama | ........... | E05D 15/0665 296/146.9 |
| 8,713,852 B2 * | 5/2014 | Choi | ..................... | E05D 15/101 49/218 |

(Continued)

*Primary Examiner* — Amy R Weisberg
*Assistant Examiner* — Veronica M Shull
(74) *Attorney, Agent, or Firm* — MORGAN, LEWIS & BOCKIUS LLP

(57) ABSTRACT

A sliding door device for a vehicle, includes: a door that opens or closes a door opening formed in a vehicle body; a door arm having a first end portion connected to the inside of the door and to extend toward a side sill of the vehicle body; a mover disposed to face the door and to be movable along the side sill; a body arm having a first end portion connected to one side of the mover, wherein the body arm is disposed in parallel to the door arm to extend toward the inside of the door; and a roller having an edge portion, respectively coupled to the door arm and the body arm so that the door arm and the body arm relatively move to each other in accordance with rotation of the roller.

12 Claims, 15 Drawing Sheets

(56) References Cited

U.S. PATENT DOCUMENTS

| | | | |
|---|---|---|---|
| 9,506,282 B2 * | 11/2016 | Linkner | E06B 3/50 |
| 10,443,282 B2 * | 10/2019 | Bauer | E05D 15/1047 |
| 10,480,232 B2 * | 11/2019 | Ishikawa | E05F 15/646 |
| 2010/0295337 A1 * | 11/2010 | Elliott | E05D 15/101 |
| | | | 296/202 |

* cited by examiner

SLIDING DOOR DEVICE FOR VEHICLE

CROSS-REFERENCE TO RELATED APPLICATION

The present application claims priority to Korean Patent Application No. 10-2021-0177455 filed on Dec. 13, 2021, the entire contents of which is incorporated herein for all purposes by this reference.

BACKGROUND OF THE PRESENT DISCLOSURE

Field of the Present Disclosure

The present disclosure relates to a sliding door device for a vehicle, and more particularly, to a sliding door device for a vehicle which may open or close a door opening of a vehicle body by sliding forwards and backwards in a longitudinal direction of the vehicle.

Description of Related Art

Generally, a vehicle has a predetermined sized cabin formed therein for boarding of a driver and accompanying occupants therein, and cabin opening/closing doors mounted to the vehicle body for opening/closing the cabin.

In a case of a passenger vehicle, the cabin opening/closing doors are front doors mounted to a front side of the vehicle in the longitudinal direction of the vehicle, and rear doors mounted to a rear side of the vehicle in the longitudinal direction of the vehicle, wherein, in general, the front doors and the rear doors are rotatably mounted to the vehicle body with hinges.

In a case of a van in which many people may board, the cabin opening/closing door opens or closes the cabin as the cabin opening/closing door slides forward/backward in the longitudinal direction of the vehicle.

Because the sliding type of cabin opening/closing door in the van opens the cabin as the cabin opening/closing door moves backward in the longitudinal direction of the vehicle, and closes the cabin as the cabin opening/closing door moves forward in the longitudinal direction of the vehicle, the sliding type of cabin opening/closing door in the van has a smaller space requirement for opening/closing the door than the hinge type of cabin opening/closing door in the passenger vehicle, to have an advantage of opening the door opening formed in the vehicle body completely even in an opening/closing space with a small width.

However, in the conventional sliding type of cabin opening/closing door, when opening/closing the door, due to the fixed sliding door arm structure, the space in which the door arm undesirably enters the side sill portion of the vehicle is excessive, thus the floor height of the vehicle may be increased to secure the space.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding door device for a vehicle which may solve the problem in which the space in which the door arm undesirably enters the side sill portion of the vehicle is excessive, by employing a sliding door structure in which a door arm and a body arm relatively move by rotation of one roller.

Various aspects of the present disclosure are directed to providing a sliding door device for a vehicle, including: a door that opens or closes a door opening formed in a vehicle body; a door arm having a first end portion connected to the inside of the door and to extend toward a side sill of the vehicle body; a mover disposed to face the door and to be movable along the side sill; a body arm having a first end portion connected to one side of the mover, wherein the body arm is disposed in parallel to the door arm to extend toward the inside of the door; and a roller having an edge portion, respectively coupled to the door arm and the body arm so that the door arm and the body arm relatively move with respect to each other in accordance with rotation of the roller.

The roller may be accommodated inside a case, and the case may be fixed to a roller pin provided at a center portion of the roller.

The door arm and the body arm may be accommodated inside the case, and the door arm and the case may be configured to move toward the outside of the door in accordance with rotation of the roller.

At an edge portion of an upper surface of the roller, a pair of roller guide pins protruding from the upper surface and disposed to face each other based on the roller pin may be provided.

One of the roller guide pins may be inserted into a door arm slot formed in a first end side of the door arm, the other of the roller guide pins may be inserted into a door arm slot formed in a second end side of the door arm, and the door arm and the body arm may relatively move with respect to each other while the roller guide pins move along the door arm slot and the body arm slot by rotation of the roller.

The roller guide pins may be provided at first and second sides of the roller, the door arm slot and the body arm slot may be formed at an upper side of a second end portion of the door arm and a lower side of a second end portion of the body arm, and the roller guide pins may be inserted into the door arm slot and the body arm slot at the first and second sides.

A moving guide pin may be provided on one surface of the case, and the moving guide pin may be inserted into a side sill rail formed on the side sill to guide the mover to linearly move along the side sill.

The side sill rail may include a first portion formed to extend toward a vertical direction of the vehicle body, and a second portion formed to extend in a longitudinal direction of the side sill from the first portion.

When the door is opened and closed, the roller may rotate so that the door arm and the body arm move to be away from each other in the vertical direction of the vehicle body, and the mover may operate to move along the one portion of the side sill rail.

When the door is opened and closed, after the roller stops rotating, the mover may operate to linearly move along the other portion of the side sill rail.

A pair of cable pins disposed to face each other based on the roller pin may be provided at an external end portion of the roller, and a cable may be connected to the cable pins to operate so that the roller may be rotated by tension applied to the cable.

The door arm and the body arm may be provided with two layers in a vertical direction of the vehicle body, and the roller may be disposed between the door arm and the body arm provided with the two layers.

According to the exemplary embodiment of the present disclosure, by employing a sliding door structure in which a door arm and a body arm relatively move by rotation of one roller, it is possible, by eliminating an amount of getting into a vehicle body of a door arm, to realize a flat structure of the vehicle body and thus it is possible to reduce a step height of the vehicle body.

Furthermore, by realizing a linear movement of a door, it is possible to improve freedom in layout and interior design.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
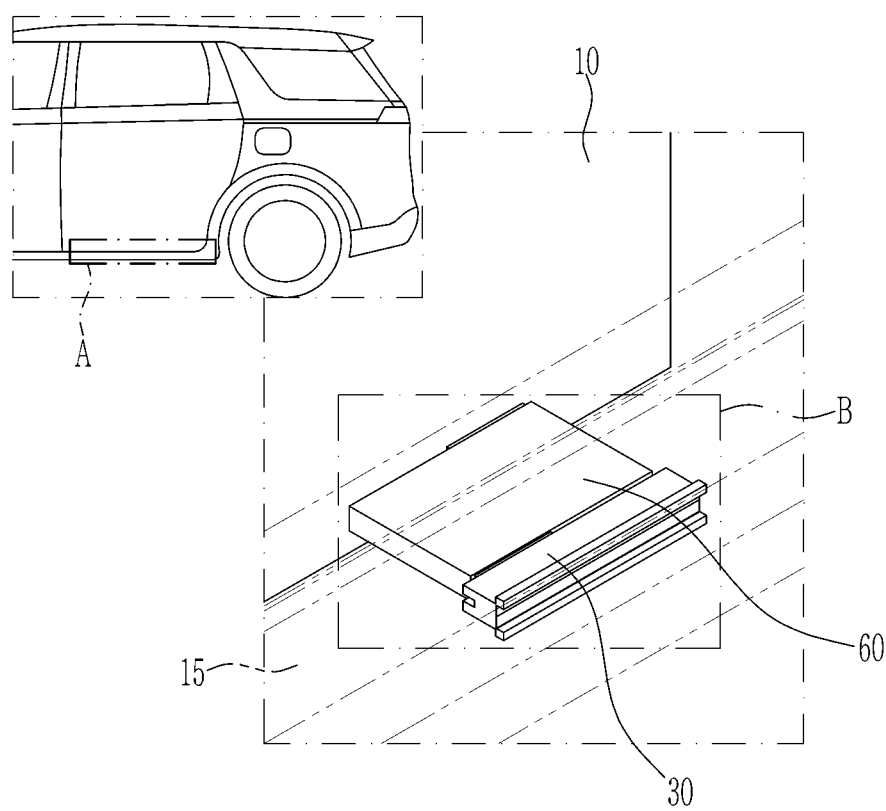
FIG. 1 illustrates a schematic view of a sliding door device for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

Furthermore, with embodiments of the present disclosure, detailed description is made of as to constituent elements in various exemplary embodiments with reference to the relevant drawings by use of the same reference numerals for the same constituent elements, while only different constituent elements from those related to the various exemplary embodiments are described in other exemplary embodiments.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. Furthermore, like structures, elements, or components illustrated in two or more drawings use same reference numerals for showing similar features. It will be understood that when an element such as a layer, film, region, area, or substrate is referred to as being "on" another element, it may be directly on the other element or intervening elements may also be present.

The present disclosure shows an exemplary embodiment of the present disclosure in detail. As a result, various modifications of the drawings will be expected. Therefore, the embodiments are not limited to a specific shape of an illustrated region, but, for example, include a change in the shape in accordance with manufacturing.

Hereinafter, a structure of a sliding door device for a vehicle according to various exemplary embodiments of the present disclosure will be described in detail with reference to the accompanying drawings.

Figure 2:
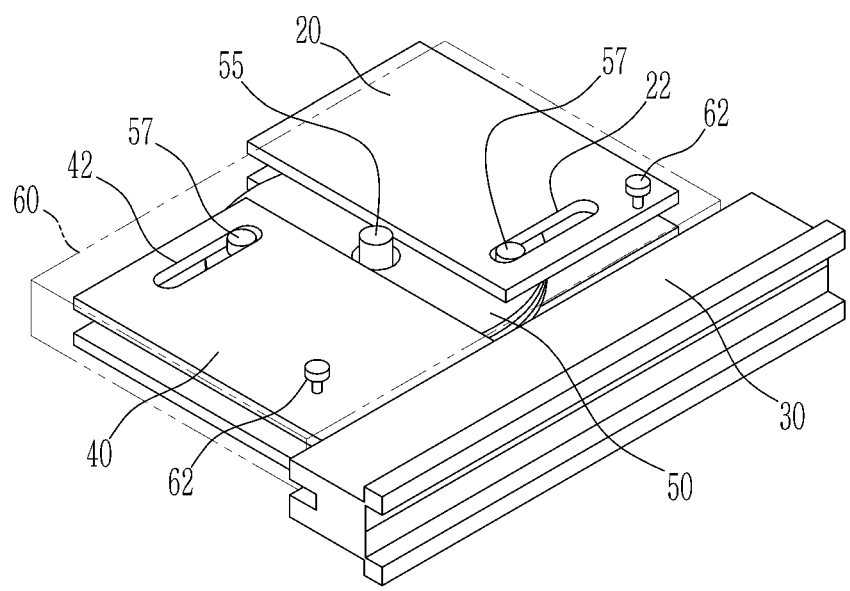
FIG. 2 illustrates an enlarged view of a portion 'B' of FIG. 1.

FIG. 1 illustrates a schematic view of a sliding door device for a vehicle according to various exemplary embodiments of the present disclosure, and FIG. 2 illustrates an enlarged view of a portion 'B' of FIG. 1.

Referring to FIG. 1, a sliding door device for a vehicle according to various exemplary embodiments of the present disclosure may be applied to a lower side of a rear door 10 provided at the rear of a vehicle in a longitudinal direction thereof, that is, a portion 'A', and it may be applied to a structure in which the rear door 10 is opened or closed by movement in internal and external directions of the vehicle and forward and backward sliding movement in the longitudinal direction of the vehicle.

Referring to FIG. 2, the sliding door device for the vehicle according to the exemplary embodiment of the present disclosure includes the door 10, a door arm 20, a mover 30, a body arm 40, and a roller 50.

The door 10 opens or closes a door opening formed in a vehicle body of the vehicle, and the door arm 20 is connected to the door 10 and the vehicle body. One end portion of the door arm 20 may be connected to the inside of the door 10, and may provide to extend toward a side sill 15 of the vehicle body.

The mover 30 is disposed to be spaced from the door 10 with a predetermined distance to face the door 10, is movably coupled to the side sill 15, and may be moved along the side sill 15. The side sill 15 may be disposed at a lower portion of a side of the vehicle body in the longitudinal direction of the vehicle body, and the side sill 15 may be provided with a side rail that provides a path so that the mover 30 is movable.

One end portion of the body arm 40 may be connected to one side of the mover 30, and may be disposed parallel to the door arm 20 to extend toward the inside of the door 10.

The roller 50 is accommodated inside a case 60, and may be rotatably fixed to upper and lower surfaces of the inside of the case 60 by a roller pin 55 provided at a center portion of the roller 50. The door arm 20 and the body arm 40 are respectively connected to an edge portion of the roller 50, and the door arm 20 and the body arm 40 may relatively move with respect to each other by rotation of the roller 50.

In the edge portion of the upper surface of the roller 50, a pair of roller guide pins 57 protruding from the upper surface of the roller 50 and facing each other based on the roller pin 55 may be provided. One of the roller guide pins 57 may be inserted into a door arm slot 22 formed at the other end side of the door arm 20, and the other of the roller guide pins 57 may be inserted into a body arm slot 42 formed at the other end side of the body arm 40. The door arm slot 22 and the body arm slot 42 may be openings formed in the longitudinal direction of the vehicle body. As the roller guide pins 57 move along the door arm slot 22 and the body arm slot 42 by rotation of the roller 50, the door arm 20 and the body arm 40 may relatively move with respect to each other.

The roller guide pins 57 may be provided on the upper and lower sides of the roller 50, and correspondingly, the door arm slot 22 and the body arm slot 42 may be respectively formed at the upper and lower sides of the other end portion of the door arm 20 and at the upper and lower sides of the other end portion of the body arm 40, and the roller guide pins 57 may be inserted into the door arm slot 22 and the body arm slot 42 at the upper and lower sides of the roller 50.

The door arm 20 and the body arm 40 may be accommodated inside the case 60, and by the rotation of the roller 50, the door arm 20 and the case 60 may move toward the outside of the door 10.

Furthermore, the door arm 20 and the body arm 40 may be provided with two layers in a vertical direction of the vehicle body, and the roller 50 may be disposed between the door arm 20 and the body arm 40 provided with two layers.

Figure 3A:
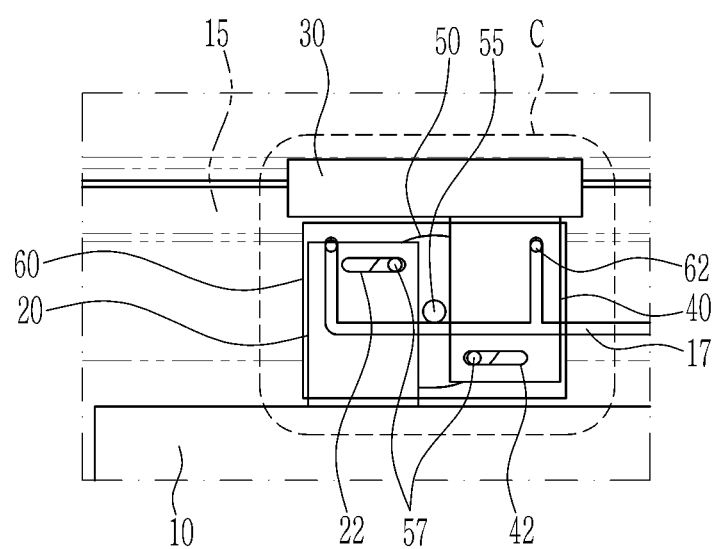
FIG. 3A and FIG. 3B illustrate top plan views of a door closed state of a sliding door device for a vehicle according to various exemplary embodiments of the present disclosure.
Figure 3B:
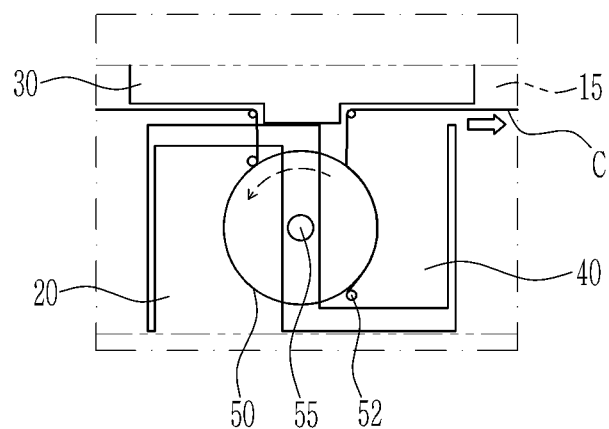

FIG. 3A and FIG. 3B illustrate top plan views of a door closed state of a sliding door device for a vehicle according to various exemplary embodiments of the present disclosure.

Referring to FIG. 2 and FIG. 3A, a moving guide pin 62 may be provided on one surface of the case 60, and a side sill rail 17 may be formed on the side sill 15. The side sill rail 17 may include one portion 18 formed to extend in the vertical direction of the vehicle body and the other portion 19 formed to extend in the longitudinal direction of the side sill 15 from the one portion.

The moving guide pin 62 may be provided on one surface of the case 60. The moving guide pin 62 may be provided in the case 60 at the upper side of each of the door arm 20 and body arm 40, and may be positioned closer to side sill 15 than the door 10.

When the door 10 is closed, the moving guide pin 62 may be inserted into one portion of the side sill rail 17, and when the door 10 starts to be opened, as the roller 50 rotates and the case 60 moves, the moving guide pin 62 may linearly move toward the door 10 along one portion of the side sill rail 17.

On the other hand, as shown in FIG. 3B, a pair of cable pins 52 disposed to face each other based on the roller pin 55 may be provided at an external end portion of the roller 50. A cable (C) is connected to the cable pins 52, and the roller 50 may be rotated by tension applied to the cable (C).

Figure 4A:
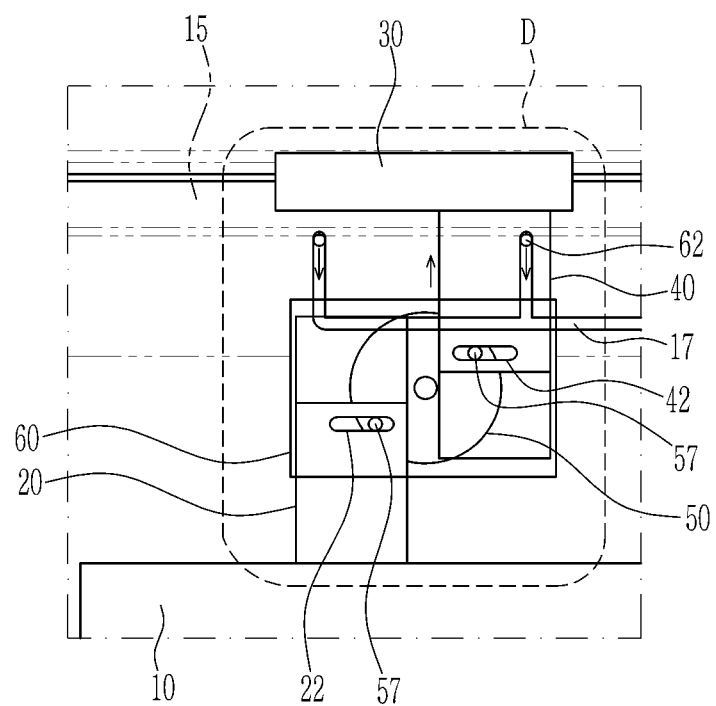
FIG. 4A and FIG. 4B illustrate states in which a door is moved toward the outside of a vehicle body in a door opened state of a sliding door device for a vehicle according to various exemplary embodiments of the present disclosure.
Figure 4B:
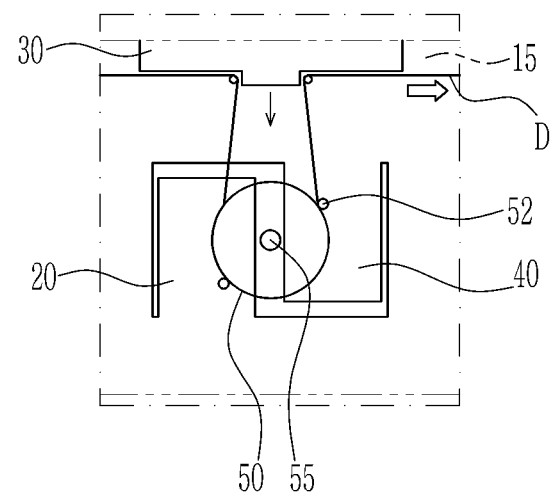

FIG. 4A and FIG. 4B illustrate states in which a door is moved toward the outside of a vehicle body in a door opened state of a sliding door device for a vehicle according to various exemplary embodiments of the present disclosure.

Referring to FIG. 4A and FIG. 4B, when the door 10 starts to be opened, the moving guide pin 62 moves toward the door 10 along one portion of the side sill rail 17, and the case 60 and the door arm 20 may also move toward the door 10.

As shown in FIG. 4B, when tension is applied to the cable (C), the roller 50 rotates counterclockwise, the door arm 20 and the body arm 40 each move outward along the door arm slot 22 and the body arm slot 42, and the door arm 20 and the case 60 move toward the outside of the door 10.

Figure 5:
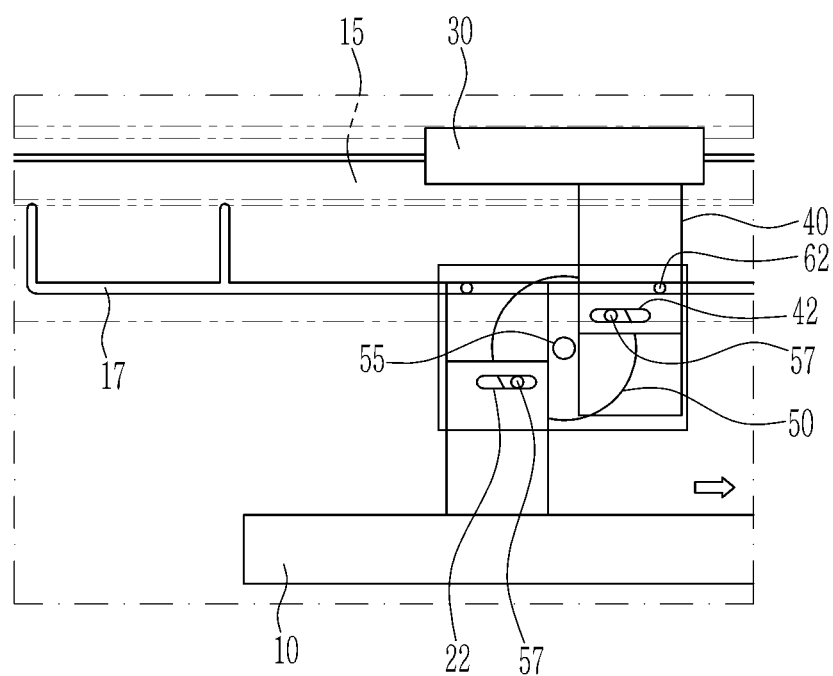
FIG. 5 illustrates a state in which a door is being moved in a longitudinal direction of a vehicle body in a door opened state of a sliding door device for a vehicle according to various exemplary embodiments of the present disclosure.

FIG. 5 illustrates a state in which a door is being moved in a longitudinal direction of a vehicle body in a door opened state of a sliding door device for a vehicle according to various exemplary embodiments of the present disclosure.

Referring to FIG. 5, when the door is opened, the moving guide pin 62 is inserted into the other portion of the side sill rail 17 to move in the longitudinal direction of the side sill 15. In the instant case, the roller 50 stops rotating, and in a state in which the relative movement of the door arm and the body arm is stopped, the mover 30 and the door linearly move along the side sill 15, and the opening of the door 10 is completed.

Figure 6:
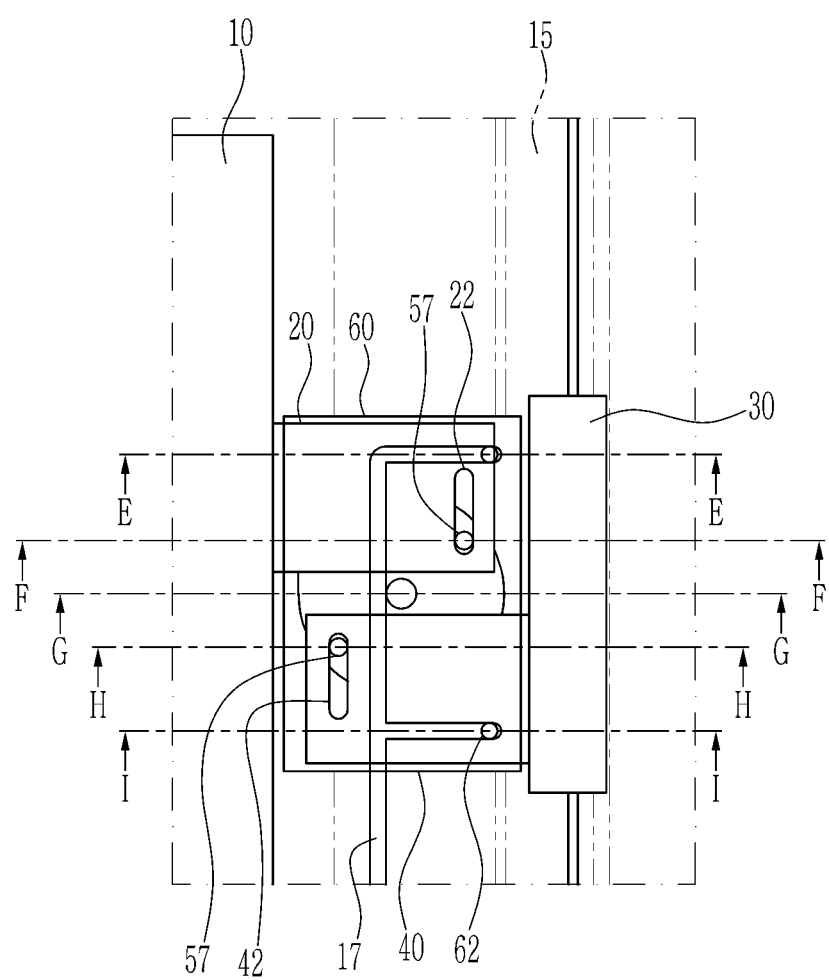
FIG. 6 is a top plan view of a door closed state for illustrating a cross-sectional view of a sliding door device for a vehicle according to various exemplary embodiments of the present disclosure.

FIG. 6 is a top plan view of a door closed state for illustrating a cross-sectional view of a sliding door device for a vehicle according to various exemplary embodiments of the present disclosure. Furthermore, FIG. 7A and FIG. 7B illustrate cross-sectional views taken along line E-E of FIG. 6.

Figure 7A:
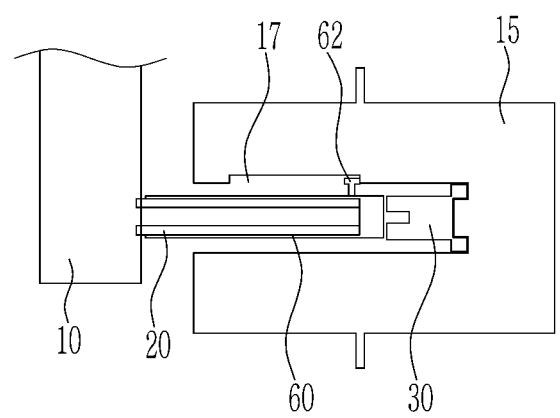
FIG. 7A and FIG. 7B illustrate cross-sectional views taken along line E-E of FIG. 6.
Figure 7B:
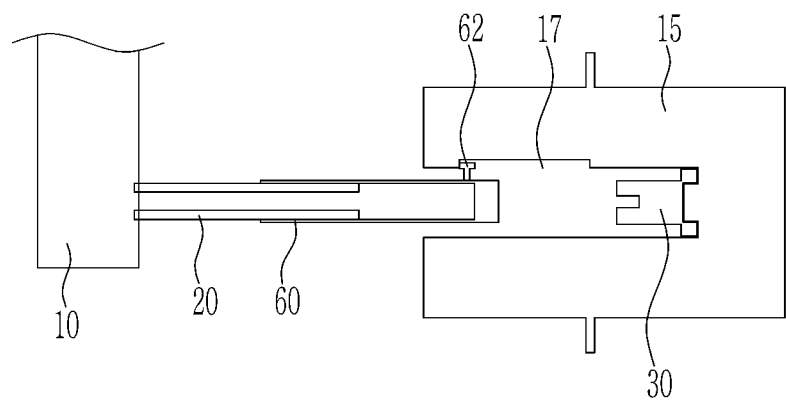

Referring to FIG. 6 and FIG. 7A and FIG. 7B, in a door closed state (FIG. 7A) of the door arm side, the moving guide pin 62 provided on the upper surface of the case 60 is inserted into one end portion of one portion of the side sill rail 17 formed on the lower surface of the upper portion of the side sill 15, and the case 60 is disposed to be close to the mover 30 and the door 10. When the door 10 starts to be opened (FIG. 7B), the roller 50 rotates, and the moving guide pin 62 moves to the other end portion of one portion of the side sill rail 17, and accordingly, the case 60, the door arm 20, and the door 10 move to be away from the side sill 15 and the mover 30, and the door arm 20 is externally exposed of the case 60.

Figure 8A:
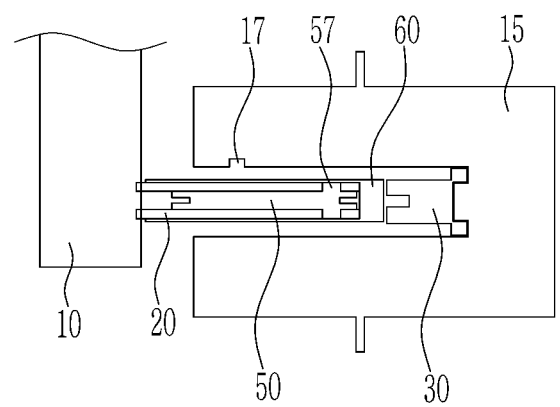
FIG. 8A and FIG. 8B illustrate cross-sectional views taken along line F-F of FIG. 6.
Figure 8B:
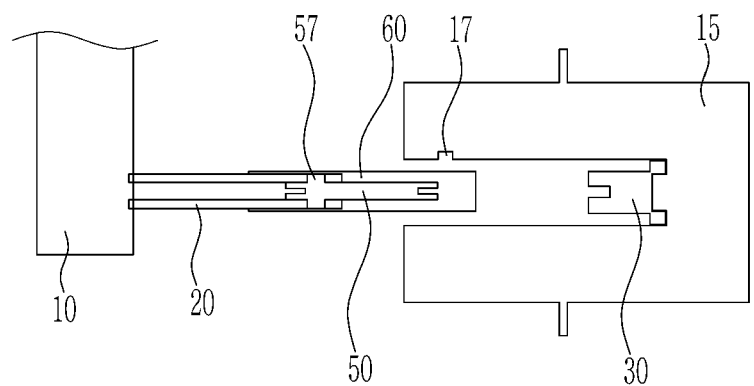

FIG. 8A and FIG. 8B illustrate cross-sectional views taken along line F-F of FIG. 6.

Referring to FIG. 8A and FIG. 8B, in a door closed state (FIG. 8A) of the door arm 20 side, the roller guide pins 57 provided on the upper and lower surfaces of the roller 50 are disposed closer to the mover 30, and the case 60 is disposed to be closer to the mover 30 and the door 10. When the door 10 starts to be opened (FIG. 8B), the roller 50 rotates, and accordingly, the roller guide pin 57 is moved to be close to the door 10. Furthermore, the case 60, the door arm 20, and the door 10 move to be away from the side sill 15 and the mover 30, and the door arm 20 is externally exposed of the case 60.

Figure 9:
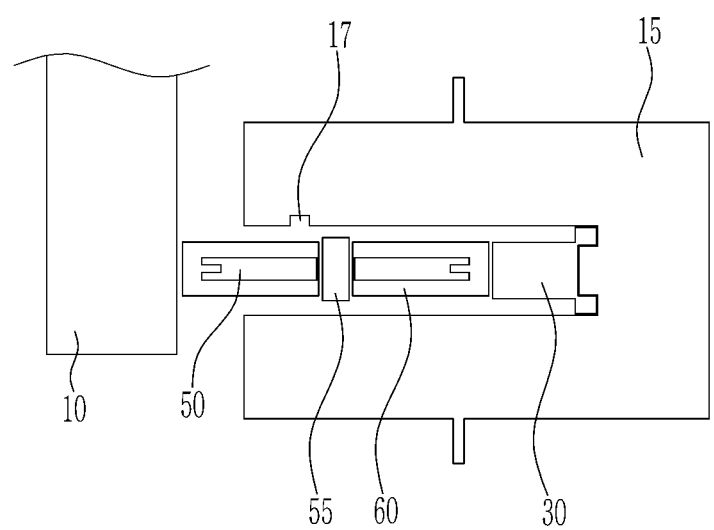
FIG. 9 illustrates a cross-sectional view taken along line G-G of FIG. 6.

FIG. 9 illustrates a cross-sectional view taken along line G-G of FIG. 6.

Referring to FIG. 9, in a state in which the door 10 is closed, the roller 50 is accommodated inside the case 60, and the roller pin 55 is fixed to the center portion of the case 60. Furthermore, the case 60 is disposed to be close to the mover 30 and the door 10. Although not shown, when the door starts to be opened, the case 60, the door arm 20, and the door 10 move to be away from the side sill 15 and the mover 30, and the door arm 20 is externally exposed of the case 60.

Figure 10:
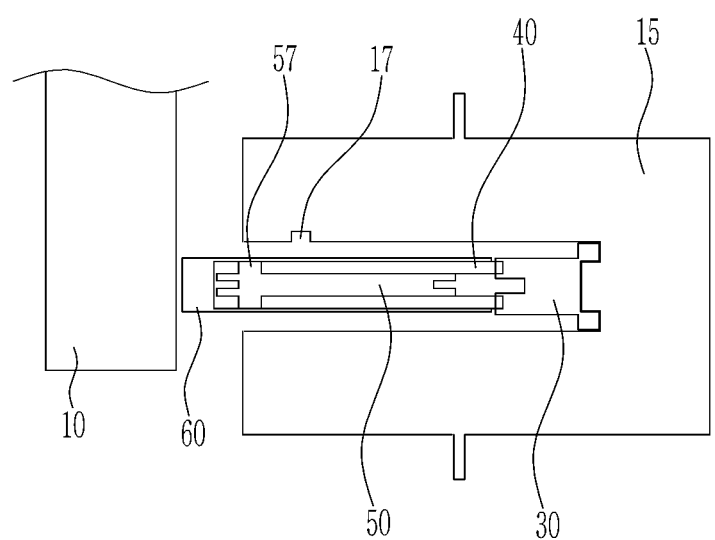
FIG. 10 illustrates a cross-sectional view taken along line H-H of FIG. 6.

FIG. 10 illustrates a cross-sectional view taken along line H-H of FIG. 6.

Referring to FIG. 10, in a state in which the door 10 of the body arm 40 side is closed, the roller guide pins 57 provided on the upper and lower surfaces of the roller 50 are disposed to be closer to the door 10, and the case 60 is disposed to be close to the mover 30 and the door 10. Although not shown, when the door 10 starts to be opened, the roller 50 rotates, and accordingly, the roller guide pin 57 is moved to be closer to the mover 30. Furthermore, the case 60, the door arm 20, and the door 10 move to be away from the side sill 15 and the mover 30, and the door arm 20 is externally exposed of the case 60.

Figure 11:
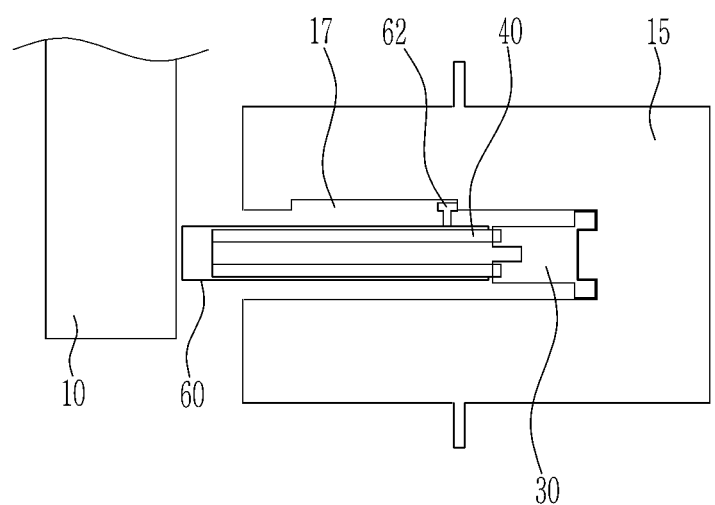
FIG. 11 illustrates a cross-sectional view taken along line I-I of FIG. 6.

FIG. 11 illustrates a cross-sectional view taken along line I-I of FIG. 6.

Referring to FIG. 11, in a state in which the door 10 is closed, the moving guide pin 62 provided on the upper surface of the case 60 is inserted into an end portion of one portion of the side sill rail 17 formed on the lower surface of the upper portion of the side sill 15, and the case 60 is disposed to be close to the mover 30 and the door 10. Although not shown, when the door 10 starts to be opened, the roller 50 rotates, and the moving guide pin 62 moves to the other end portion of one portion of the side sill rail 17, and accordingly, the case 60, the door arm 20, and the door 10 move to be away from the side sill 15 and the mover 30, and the door arm 20 is externally exposed of the case 60.

As described above, according to the exemplary embodiment of the present disclosure, by employing the sliding door structure in which the door arm and the body arm relatively move by the rotation of one roller, it is possible, by eliminating an amount of intrusion into a vehicle body of the door arm, to realize a flat structure of the vehicle body and thus it is possible to reduce a step height of the vehicle body.

Furthermore, by realizing a linear movement of the door, it is possible to improve freedom in layout and interior design.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:
   a door that opens or closes a door opening formed in a vehicle body;
   a door arm having a first end portion connected to the inside of the door and to extend toward a side sill of the vehicle body;
   a mover disposed to face the door and to be movable along the side sill;
   a body arm having a first end portion connected to one side of the mover, wherein the body arm is disposed in parallel to the door arm to extend toward the inside of the door; and
   a roller having an edge portion, respectively coupled to the door arm and the body arm so that the door arm and the body arm relatively move with respect to each other in accordance with rotation of the roller,
   wherein the roller is rotatably accommodated inside a case, and
   wherein the case is coupled to a roller pin provided at a center portion of the roller.

2. The sliding door apparatus of claim 1,
   wherein the door arm and the body arm are accommodated inside the case, and
   wherein the door arm and the case are configured to move toward the outside of the door in accordance with rotation of the roller.

3. The sliding door apparatus of claim 1, wherein at an edge portion of an upper surface of the roller, first and second roller guide pins protruding from the upper surface and disposed to face each other in relation to the roller pin are provided.

4. The sliding door apparatus of claim 3,
   wherein the first roller guide pin is inserted into a door arm slot formed in an end side of the door arm,
   wherein the second roller guide pin is inserted into a body arm slot formed in an end side of the body arm, and
   wherein the door arm and the body arm relatively move with respect to each other while the first and second roller guide pins move along the door arm slot and the body arm slot by rotation of the roller.

5. The sliding door apparatus of claim 4, wherein the door arm slot and the body arm slot are aligned in a longitudinal direction of the side sill.

6. The sliding door apparatus of claim 4,
   wherein the first and second roller guide pins are provided at first and second sides of the roller,
   wherein the door arm slot and the body arm slot are formed at an upper side of a second end portion of the door arm and a lower side of a second end portion of the body arm, and
   wherein the first and second roller guide pins are inserted into the door arm slot and the body arm slot at the first and second sides.

7. The sliding door apparatus of claim 1, wherein a moving guide pin is provided on a surface of the case, and the moving guide pin is inserted into a side sill rail formed on the side sill to guide the mover to linearly move along the side sill.

8. The sliding door apparatus of claim 7, wherein the side sill rail includes a first portion formed to extend toward a vertical direction of the vehicle body, and a second portion formed to extend in a longitudinal direction of the side sill from the first portion.

9. The sliding door apparatus of claim 8, wherein when the door is opened and closed, the roller rotates so that the door arm and the body arm move to be away from each other in the vertical direction of the vehicle body, and the mover operates to move along the first portion of the side sill rail.

10. The sliding door apparatus of claim 9, wherein when the door is opened and closed, after the roller stops rotating, the mover operates to linearly move along the second portion of the side sill rail.

11. The sliding door apparatus of claim 1,
wherein a pair of cable pins disposed to face each other based on the roller pin are provided at an external end portion of the roller, and
wherein a cable is connected to the cable pins to operate so that the roller is rotated by tension applied to the cable.

12. The sliding door apparatus of claim 1, wherein the door arm and the body arm are provided with first and second layers in a vertical direction of the vehicle body, and the roller is disposed between the door arm and the body arm provided with the first and second layers.

\* \* \* \* \*